United States Patent Office 3,459,810
Patented Aug. 5, 1969

3,459,810
PROCESS FOR THE PREPARATION OF
ETHYLBENZENE HYDROPEROXIDE
Chai Y. Choo, Westwood, and Richard L. Golden, Oradell, N.J., assignors to Halcon International, Inc., a corporation of Delaware
No Drawing. Filed Dec. 30, 1965, Ser. No. 517,821
Int. Cl. C07c 3/00, 73/06
U.S. Cl. 260—610       2 Claims

ABSTRACT OF THE DISCLOSURE

The invention relates to an improved process for the preparation of ethylbenzene hydroperoxide via the liquid phase oxidation of ethylbenzene with molecular oxygen. The inventive features resides in the provision of stepdown temperature conditions wherein a higher temperature is maintained during the earlier part of the reaction than during the later part of the reaction. Practice of the invention is attended by new results and advantages comprising reduced reaction time without a yield penalty or alternatively increased yield without a reaction time penalty.

---

This invention relates to an improved process for the preparation of ethylbenzene hydroperoxide via the liquid phase oxidation of ethylbenzene. More specifically, it relates to an improvement in the oxidation which permits the process to be carried out in less time than heretofore has been necessary with no sacrifice of raw material yields or alternatively to be carried out with increased yields at the same reaction times as have heretofore been necessary.

Ethylbenzene hydroperoxide (alpha-phenyl ethylhydroperoxide) has recently found several important new uses in oxidation chemical processes. For example, in the epoxidation of olefins to form olefin oxides, past technology has required either the use of chloine to form an intermediate chlorohydrin compound or the use of strong oxidizing agents such as peracids. In the chlorine route expensive materials of construction are required in the processing units, hydrogen chloride is produced as an oftentimes unwanted by-product and the manufacturing steps are complicated and cumbersome. In processes using peracids, such as peracetic acid, extensive precautions must be taken to minimize the dangers of explosion. This adds considerable cost to the manufacturing plants for the olefin oxides.

Ethylbenzene hydroperoxide when used as an oxygen bearer in olefin epoxidation reactions obviates many of the inconveniences and costs of chlorine or peracid process routes. For example, no special materials of construction are required, the hazards of explosion are minimized and both no-by-product processes and styrene co-product processes are easily developed.

The objectives of this invention are to provide an improved process for the preparation of ethylbenzene hydroperoxide from ethylbenzene by molecular oxygen oxidations. More specifically the objectives are to reduce the time required to prepare an ethylbenzene oxidate of given hydroperoxide content and at the same time to minimize by-product formation. By reduction of reaction times it is possible to reduce plant equipment sizes and engineering costs.

It is a further objective to provide such oxidation techniques as will insure that the oxidate formed will be relatively free of oxidation side products.

It is known in the art that the ethylbenzene oxidation can be performed at temperatures ranging from 100° C. to 165° C. It is also well known that as the temperature of the oxidation is increased, the reaction rate of ethylbenzene is increased. It is desirable, therefore, in order to minimize process equipment sizes, to carry out the ethylbenzene oxidation at maximum temperatures consistent with achieving reasonably high process yields.

As the oxidation temperature is increased, however, the rates of reactions which form undesirable by-products are increased. Above about 165° C. much raw material is lost to side products; furthermore the problems of separating these side products cause the oxidation process to become uneconomical.

A further problem encountered in the development of workable ethylbenzene oxidation processes is the increased rate of reaction to side products at higher ethylbenzene hydroperoxide concentrations. It is, of course, desirable to convert as much ethylbenzene to hydroperoxide as possible in a single reaction pass; however, it has been found that prohibitively large amounts of undesirable oxidation side products are formed when ethylbenzene hydroperoxide is permitted to concentrate in the ethylbenzene oxidate.

The amount of ethylbenzene that should be converted in any oxidation depends upon the competing factors of equipment size and ethylbenzene hydroperoxide yield. Generally speaking, as the conversion is increased above about 15 to 17% of the feed ethylbenzene, the rate of by-product formation is substantially increased and the yield of hydroperoxide will suffer. Conversely, at conversions of less than about 5%, the cost of oxidizing ethylbenzene becomes pohibitive due to the additional ethylbenzene recycle equipment.

It has now been discovered that the reaction time required to effect a given ethylbenzene conversion can be substantially decreased with no change in hydroperoxide yield on raw material due to by-product formation if the oxidation reaction is performed under programmed temperature conditions rather than at one temperature. It has been discovered also that the formation of by-products can be minimized at the same reaction time as is required by isothermal processes, if the temperature of the oxidation is maintained at an initially high value and then decreased during the course of the oxidation. Although temperature programming of the reaction requires careful process control, the overall advantages accruing to the process because of reduced reaction times or smaller by-product formation are more than substantial.

During about one half of the total reaction time required to convert the desired percenage of ethylbenzene, the temperature should be controlled in the range of 135° to 165° C. During the remainder of the total reaction time the reaction temperature should be maintained between about 125° C. and about 155° C. It is essential that the temperature during the second half of the reaction be less than the temperature during the first half of the reaction. It is, of course, possible to reduce the reaction temperature according to any desired rate. It is only essential that the average temperature during the later part of the reaction be less than the reaction temperature during the earlier part of the reaction. By accelerating the rate of reaction of hydroperoxide during the early part of the reaction, the concentrated hydroperoxide solution is maintained at high process temperatures for a lesser period, thereby decreasing or at least maintaining constant the amount of by-product formation.

In order to indicate more fully the advantages of the present invention, the following illustrative example is set forth. All parts and percents are parts and percents by weight, unless otherwise indicated.

Example I

Flash-distilled liquid ethylbenzene in the amount of 2.5 kg. was placed in a glass-lined autoclave of 1 gallon capacity, and air was introduced below the surface of the liquid and near a mechanical stirring device which insured rapid and intimate mixing of the air with the ethylbenzene. The autoclave was equipped with a reflux condenser through which effluent gases were removed.

Samples of the reaction mixture were taken at the end of each run and analyzed for hydroperoxide content by the well known iodemetric method, and for by-product acids by titrating with sodium hydroxide. Analyses for acetophenone and alpha-phenylethanol were made by infrared absorption method.

The oxygen concentration of the gas leaving the reactor during the oxidation was kept constant by manipulation of the air feed rate.

The following table demonstrates that at isothermal conditions wherein a 12.5% conversion of ethylbenzene is performed in a period of time equal to the period required for the programmed temperature process more reaction by-products are formed. Thus, reaction can be accomplished in the same time period but there is a penalty of higher by-product formation and loss is raw material yield.

It can be readily seen from the above table that significant yield advantages in the epoxidation step are achieved by using ethylbenzene oxidates prepared by the method of this invention. Furthermore, product separation problems caused by the by-products are minimized.

Ethylbenzene may be oxidized in any standard equipment used in oxidation processes; the oxidation can be carried out batchwise or continuously with equal facility. A stainless steel or glass-lined vessel equipped with inlet and outlet taps for both liquid and vapor, a pressure control on the vent gas line, an agitator and a suitable temperature control scheme, have been used in the investigations which lead to the discovery disclosed herein.

Any oxygen-bearing gas may be used in an ethylbenzene oxidation provided that the gases other than oxygen are inert at the reaction conditions. Air is the preferred oxidation gas because of its ready availability but gases richer or poorer in oxygen than air may be used with equal facility.

The reaction pressure may be maintained at from atmospheric to 1000 p.s.i.g., although the pressure is desirably maintained at from 10 p.s.i.g. to 200 p.s.i.g. The

TABLE I

| | Temperature programmed oxidation runs | | | | | |
|---|---|---|---|---|---|---|
| Run No. | Temp., °C. | Reaction time, min. | EBHP, g.-mole/kg. | Acid, g.-equiv./kg. | ACP, g.-mole/kg. | MBA, g.-mole/kg. |
| 1 (1358-41) | 150 | 60 | 0.017 | | | |
| | 150 | 120 | 0.460 | .0015 | 0.0158 | 0.0319 |
| | 150 | 150 | 0.668 | .0038 | 0.0492 | 0.0598 |
| | 150 | 180 | 0.793 | .0069 | 0.1022 | 0.0901 |
| | 150 | 215 | 0.916 | .0132 | 0.200 | 0.147 |
| 2 (1379-73) | 155 | 0 | | | | |
| | 141 | 60 | .216 | | | |
| | 139 | 120 | .428 | .0013 | | .0221 |
| | 137 | 180 | .658 | .0033 | .0224 | .0335 |
| | 137 | 250 | .932 | .0069 | .0175 | .0531 |
| 3 (1379-65) | 155 | 0 | | | | |
| | 143 | 60 | .261 | 0 | | |
| | 141 | 120 | .546 | .0117 | .0100 | .1254 |
| | 140 | 172 | .772 | .0053 | .0416 | .0392 |
| | 139 | 210 | .904 | .0074 | .0698 | .0540 |

EBHP—ethylbenzene hydroperoxide, ACP—acetophenone, MBA—methylbenzyl alcohol.

The above table also demonstrates that the temperature programming can be used to minimize reaction time at the same or less by-product formation as in the isothermal reaction.

The formation of by-products has even more severe consequences since it is possible and desirable to use the oxidate formed by this inventive process without further purification in the epoxidation of an olefinic compound. It may, in some cases, be advisable to remove unconverted ethylbenzene prior to the epoxidation step but this is not essential. The following example illustrates the advantages to be gained in the epoxidation of olefinic materal with an ethylbenzene oxidate containing ethylbenzene hydroperoxide formed under conditions wherein the quantity of by-products formed during the oxidation is minimized.

Example II

Epoxidations of propylene with ethylbenzene hydoperoxide were carried out at 110° C. using propylene to hydroperoxide molar ratios of 6. Molybdenum naphthenate was used as the epoxidation catalyst. The amount of molybdenum used was one gram of molybdenum per 1000 grams of ethylbenzene hydroperoxide. In a one hour batch reaction time, the conversion of peroxide was essentially complete. The epoxidation results are presented below.

| Run No. | EBHP source | Molar selectivity of EBHP to propylene oxide, percent | High boiler yield, grams per 100 grams EBHP reacted |
|---|---|---|---|
| 1 | 1 (1358-41) | 74 | 11.4 |
| 2 | 3 (1379-65) | 74 | 5.2 | oxidation of ethylbenzene is exothermic and it is, of course, necessary that some heat be removed. It is most desirable to operate at the adiabatic pressure, that is, the pressure at which all of the excess heat produced in the reaction is removed as latent heat of vaporization in boiled-up hydrocarbons since there is no requirement for cooling coils or water jacketed reaction vessels or other types of heat removal apparatus; nor is there any net heat requirement once the reaction mixture is brought to temperature and initiated. The adiabatic pressure depends upon the temperature of the reaction, the amount of feed gas, the reactant feed temperature, the degree of ethylbenzene conversion, etc. and thus cannot be specifically defined except in relation to these variables. When operating at this pressure, all of the heat of reaction is removed in an overhead vent condenser wherein the boiled up hydrocarbons are condensed and returned to the reaction vessel.

It is of considerable importance in oxidizing ethylbenzene by these methods to remove any water which either forms in the reaction or is introduced into the reactor via the raw materials. This water may be removed by decantation from the overhead vent condensate; it is unnecessary to use any more elaborate physical or chemical dehydration schemes although such schemes can be employed.

The epoxidation using the ethylbenzene hydroperoxide is carried out in the presence of epoxidation catalysts which may be compounds of the following: Ti, V, Se, Cr, Zn, Nb, Ta, To, U, Mo, Ta, W and Ra. The preferred catalysts are compounds of Mo, Ti, V, W, Re, Se, Nb and Te.

The amount of metal in solution used as a catalyst in the epoxidation process can be varied widely, although as a rule it is desirable to use at least 0.00001 mol and preferably 0.002 to 0.03 mol per mol of hydroperoxide present. Amounts greater than about 0.1 mol seem to give no advantage over smaller amounts, although amounts up to 1 mol or more per mol of hydroperoxide can be employed. The catalysts remain dissolved in the reaction mixture throughout the process and can be reused in the reaction after removal of the reaction products therefrom. The molybdenum compounds include the molybdenum organic salts, the oxides such as $Mo_3O_3$, $MoO_3$, molybdic acid, the molybdenum chlorides and oxychlorides, molybdenum fluoride, phosphate, sulfide, and the like. Here, too, polyacids containing molybdenum can be used as can salts thereof; examples include phosphomolybdic acid and the sodium and potassium salts thereof. Similar or analogous compounds of the other metals mentioned may be used, as may mixtures thereof.

The catalytic components may be employed in the epoxidation reaction in the form of a compound or mixture which is initially soluble in the reaction medium. While solubility will to some extent depend on the particular reaction medium employed, a suitably soluble substance contemplated by the invention would include hydrocarbon soluble, organo-metallic compounds having a solubility in methanol at room temperature of at least 0.1 gram per liter. Illustrative soluble forms of the catalytic materials are the naphthenates, stearates, octoates, carbonyls and the like. Various chelates, association compounds and enol salts, such, for example, as acetoacetonates may also be used. Specific and preferred catalytic compounds of this type for use in the invention are the naphthenates and carbonyls of molybdenum, vanadium, titanium, tungsten, rhenium, niobium, tantalum and selenium. Alkoxy compounds such as tetrabutyl titanate and other like alkyl titanates are very useful.

Temperatures which can be employed in the epoxidation can vary quite widely depending upon the reactivity and other characteristics of the particular system. Temperatures broadly in the range of about —20° to 200° C., desirably 0 to 150° C., and preferably 50° C. to 120° C. can be employed. The reaction is carried out at pressure conditions sufficient to maintain a liquid phase. Although sub-atmospheric pressures can be employed, pressures usually in the range of about atmospheric to about 1000 p.s.i.g. are most desirable.

Olefinically unsaturated materials which can be epoxidized by ethylbenzene hydroperoxide include substituted and unsubstituted aliphatic and alicyclic olefins which may be hydrocarbons or esters or alcohols or ketones or ethers or the like. Preferred compounds are those having from about 2 to 30 carbon atoms, and preferably at least 3 carbon atoms. Illustrative olefins are ethylene, propylene, normal butylene, isobutylene, the pentenes, the methyl pentenes, the normal hexenes, the octanes, the dodecenes, cyclohexene, methyl cyclohexene, butadiene, styrene, methyl styrene, vinyl toluene, vinylcyclohexene, the phenyl cyclohexenes, and the like. Olefins having halogen, oxygen, sulfur and the like containing substituents can be used. Such substituted olefins are illustrated by allyl alcohol, methallyl alcohol, cyclohexanol, diallyl ether, methyl methacrylate, methyl oleate, methyl vinyl ketone, allyl chloride, and the like. In general, all olefinic materials epoxidized by methods previously employed can be epoxidized in accordance with this process including olefinically unsaturated polymers.

The lower olefins having about 3 or 4 carbon atoms in an aliphatic chain are most advantageously epoxidized by the reaction with ethylbenzene hydroperoxide. The class of olefins commonly termed alpha-olefins or primary olefins are also epoxidized in a particularly efficient manner by this process. It is known to the art that these primary olefins, e.g., propylene, butene-1, decene-1, hexadecene-1, etc. are epoxidized with more difficulty than other forms of olefins, except for ethylene. Other forms of olefins which are more easily epoxidized are substituted olefins, alkenes with internal unsaturation, cycloalkenes and the like.

In the epoxidation, the ratio of olefin to ethylbenzene hydroperoxide can vary over a wide range. Generally, mol ratios of olefinic groups to hydroperoxide broadly in the range of 0.5:1 to 100:1, desirably 1:1 to 20:1 and preferably 2:1 to 10:1 are employed. Additionally, it is advantageous to carry out the reaction to achieve as high a hydroperoxide conversion as possible, preferably at least 50% and desirably at least 90%, consistent with reasonable selectivities.

The ethylbenzene hydroperoxide which reacts to epoxidize the olefin is itself substantially converted to alpha-phenyl ethanol.

In view of the foregoing disclosures, variations and modifications thereof will be apparent to one skilled in the art, and it is intended to include within the invention all such variations and modifications except as do not come within the scope of the appended claims.

What is claimed is:

1. In a process for the reaction of ethylbenzene in the liquid phase with molecular oxygen to form ethylbenzene hydroperoxide, the improvement which comprises maintaining the reaction temperature between 135° C. and 165° C. during the first half of the reaction and maintaining the reaction temperature between 125° C. and 155° C. during the second half of the reaction, the temperature during the first half of the reaction being higher than the temperature during the second half of the reaction, and maintaining the pressure in the range from atmosphere to 1000 p.s.i.g.

2. A process as recited in claim 1 wherein from 5 to 17% of the ethylbenzene feed is converted to ethylbenzene hydroperoxide.

References Cited

UNITED STATES PATENTS

| | | | |
|---|---|---|---|
| 2,749,368 | 6/1956 | Fortuin et al. | 260—610 |
| 2,867,666 | 1/1959 | Erickson et al. | 260—610 |

OTHER REFERENCES

Cullis: "Chem. and Industry" (1962) pp. 23–28.
Kucher et al.: Chem. Abs., vol 56 (1962) p. 859E BERNARD HELFIN, Primary Examiner
W. B. LONE, Assistant Examiner